US012705340B2

(12) United States Patent
Lin et al.

(10) Patent No.: US 12,705,340 B2
(45) **Date of Patent: *Aug. 11, 2026**

(54) DETECTION OF MALICIOUS DIRECT MEMORY ACCESS DEVICE USED FOR DIRECT DEVICE ASSIGNMENT

(71) Applicant: Microsoft Technology Licensing, LLC, Redmond, WA (US)

(72) Inventors: Jin Lin, Seattle, WA (US); Cody Dean Hartwig, Seattle, WA (US); Jason Stewart Wohlgemuth, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 19 days.

This patent is subject to a terminal disclaimer.

(21) Appl. No.: 18/499,035

(22) Filed: Oct. 31, 2023

(65) Prior Publication Data

US 2025/0139235 A1 May 1, 2025

(51) Int. Cl.
*G06F 21/55* (2013.01)
*G06F 13/28* (2006.01)

(52) U.S. Cl.
CPC ............ *G06F 21/552* (2013.01); *G06F 13/28* (2013.01); *G06F 2221/034* (2013.01)

(58) Field of Classification Search
CPC ...... G06F 21/552; G06F 21/566; G06F 21/53; G06F 21/57; G06F 21/85; G06F 13/28; G06F 2221/034; G06F 21/52; G06F 2221/2135; G06F 21/554; G06F 9/45558; G06F 2009/45579; G06F 2009/45586;
(Continued)

(56) References Cited

U.S. PATENT DOCUMENTS 7,689,733 B2 3/2010 Carpenter
8,102,881 B1 * 1/2012 Vincent .................. H04L 69/12 370/474

(Continued)

OTHER PUBLICATIONS

Song, Dokyung, et al. "PeriScope: An Effective Probing and Fuzzing Framework for the Hardware-OS Boundary." NDSS. 2019. (Year: 2019).*

(Continued)

*Primary Examiner* — Catherine Thiaw
*Assistant Examiner* — Amir Mahdi Hajiabbasi
(74) *Attorney, Agent, or Firm* — Workman Nydegger

(57) ABSTRACT

Detection of malicious direct memory access (DMA) device used for direct device assignment. A virtualization computer system assigns a peripheral device to an operating context within a virtualization environment. The peripheral device is DMA capable. The virtualization computer system monitors a signal source that is affected by DMA operations initiated by the peripheral device while the peripheral device is assigned to the operating context. Based on monitoring the signal source, the virtualization computer system identifies a signal pattern characterizing the DMA operations that are initiated by the peripheral device. Using the signal pattern, the virtualization computer system determines that the DMA operations initiated by the peripheral device are abnormal and the virtualization computer system identifies the peripheral device as malicious.

18 Claims, 5 Drawing Sheets

(58) Field of Classification Search
CPC . G06F 2009/45587; G06F 2009/45591; G06F 2213/28
See application file for complete search history.

(56) References Cited

U.S. PATENT DOCUMENTS

| | | | | |
|---|---|---|---|---|
| 8,214,653 | B1 * | 7/2012 | Marr | G06F 8/65 713/150 |
| 8,327,137 | B1 * | 12/2012 | Erb | G06F 21/53 718/1 |
| 10,013,388 | B1 * | 7/2018 | Wang | G06F 13/4282 |
| 10,282,328 | B2 | 5/2019 | Lee | |
| 10,970,235 | B2 | 4/2021 | Hong | |
| 11,113,086 | B1 * | 9/2021 | Steinberg | G06F 9/45558 |
| 11,144,638 | B1 * | 10/2021 | Golden | G06F 21/566 |
| 11,151,068 | B1 | 10/2021 | Haldar | |
| 11,182,473 | B1 * | 11/2021 | Ha | G06F 9/45558 |
| 11,386,029 | B2 | 7/2022 | Winblad | |
| 11,860,804 | B2 | 1/2024 | Lin | |
| 12,034,647 | B2 | 7/2024 | Lee | |
| 12,189,726 | B2 | 1/2025 | Sahita | |
| 2012/0216191 | A1 * | 8/2012 | Tsai | G06F 9/45558 718/1 |
| 2013/0010636 | A1 | 1/2013 | Regula | |
| 2013/0145055 | A1 * | 6/2013 | Kegel | G06F 12/0223 710/26 |
| 2013/0283193 | A1 * | 10/2013 | Griffin | G06F 3/1446 715/761 |
| 2014/0032794 | A1 | 1/2014 | Kanigicherla | |
| 2014/0223543 | A1 * | 8/2014 | Jeansonne | G06F 21/56 726/16 |
| 2016/0242690 | A1 | 8/2016 | Principe | |
| 2016/0328561 | A1 * | 11/2016 | Tamir | G06F 21/552 |
| 2017/0249106 | A1 * | 8/2017 | Apfelbaum | G06F 12/1433 |
| 2018/0095900 | A1 * | 4/2018 | Sarangdhar | G06F 13/1668 |
| 2020/0050566 | A1 | 2/2020 | Hussain | |
| 2021/0117249 | A1 | 4/2021 | Doshi et al. | |
| 2021/0216430 | A1 | 7/2021 | Klein | |
| 2021/0294900 | A1 * | 9/2021 | Mooring | G06F 21/53 |
| 2021/0390179 | A1 * | 12/2021 | Hahn | G06F 21/602 |
| 2022/0012369 | A1 * | 1/2022 | Constable | G06F 21/53 |
| 2022/0083486 | A1 | 3/2022 | George | |
| 2022/0114107 | A1 | 4/2022 | Duda | |
| 2022/0308909 | A1 | 9/2022 | Tsirkin | |
| 2023/0205563 | A1 * | 6/2023 | Raj | G06F 9/45558 718/1 |
| 2023/0281302 | A1 * | 9/2023 | Chan | G06F 21/85 726/23 |
| 2023/0401130 | A1 | 12/2023 | Mehta | |
| 2023/0401132 | A1 | 12/2023 | Patle | |
| 2024/0028590 | A1 | 1/2024 | Richter | |
| 2024/0072995 | A1 * | 2/2024 | Tsirkin | G06F 13/4027 |
| 2024/0168891 | A1 | 5/2024 | Sharma | |
| 2024/0289151 | A1 * | 8/2024 | Ng | G06F 9/45558 |
| 2024/0320174 | A1 | 9/2024 | Pedersen | |
| 2024/0385641 | A1 | 11/2024 | Sproch | |
| 2024/0427679 | A1 | 12/2024 | Patle | |
| 2025/0045231 | A1 | 2/2025 | Teglia | |
| 2025/0139034 | A1 | 5/2025 | Lin | |

OTHER PUBLICATIONS

International Search Report and Written Opinion received for PCT Application No. PCT/US2024/050298 (MS# 413504- PCT01), Dec. 19, 2024, 14 pages.

International Search Report and Written Opinion received for PCT Application No. PCT/US2024/050299 (MS#413505-PCT01), Dec. 17, 2024, 14 pages.

Pek, et al., "On the feasibility of software attacks on commodity virtual machine monitors via direct device assignment", Proceedings of the 9th ACM symposium on Information, computer and communications security, Jun. 4, 2014, pp. 305-316.

Stewin Patrick, "A Primitive for Revealing Stealthy Peripheral-Based Attacks on the Computing Platform's Main Memory" Research in Attacks, Intrusions, and Defenses, Oct. 23, 2013, pp. 1-20.

Stewin, et al., "Understanding DMA Malware", Detection of Intrusions and Malware, and Vulnerability Assessment, Jul. 26, 2012, pp. 21-41.

Stewin, et al., "A Primitive for Revealing Stealthy Peripheral-Based Attacks on the Computing Platform's Main Memory" Research in Attacks, Intrusions, and Defenses, Oct. 23, 2013, pp. 1-20.

Stewin, et al., "Understanding DMA Malware", Detection of Intrusions and Malware, andSpringer Berlin Heidelberg, Berlin, Heidelberg, Jul. 26, 2012, pp. 21-41.

Non-Final Office Action mailed on Feb. 13, 2025, in U.S. Appl. No. 18/499,028, (MS# 413504-US01) 19 pages.

U.S. Appl. No. 18/499,028, filed Oct. 31, 2023.

Office Action mailed on Aug. 27, 2025, in U.S. Appl. No. 18/499,028, (MS#413504-US01) 22 pages.

Notice of Allowance mailed on Apr. 15, 2026, in U.S. Appl. No. 18/499,028, 9 pages.

International Preliminary Report on Patentability (Chapter I) received for PCT Application No. PCT/US2024/050298, mailed on May 15, 2026, 08 pages.

International Preliminary Report on Patentability (Chapter I) received for PCT Application No. PCT/US2024/050299, mailed on May 15, 2026, 09 pages.

* cited by examiner

DETECTION OF MALICIOUS DIRECT MEMORY ACCESS DEVICE USED FOR DIRECT DEVICE ASSIGNMENT

BACKGROUND

Virtualization environments, including container-based systems, are commonly used in modern computing systems to allow multiple operating systems (OSs) and applications to run concurrently on a single physical machine within isolated operating contexts. These environments often include a hypervisor or container orchestration platform, which are software layers that manage the allocation of physical resources, such as processors, memory, and peripheral devices, to the various OSs and applications running within the environment.

Peripheral devices, such as hardware controllers (e.g., storage controllers, network controllers), hardware accelerators (e.g., graphics processing units, neural processing units), and the like, are often assigned to specific operating contexts within the virtualization environment. Peripheral devices usually adhere to a defined bus connectivity standard, which defines interfaces for connecting peripheral devices to a computer motherboard, a system on a chip, or other hardware devices. Example bus connectivity standards include peripheral component interconnect express (PCIe) and compute express link (CXL). Peripheral devices are often capable of direct memory access (DMA), which allows the peripheral device to access system memory directly, bypassing the physical machine's central processing unit (CPU) and improving performance (e.g., by allowing the peripheral device to read from or write to system memory independently of the CPU, thereby freeing up CPU resources for other tasks). When a peripheral device is assigned to a specific operating context within a virtualization environment, this assignment is typically direct (e.g., using discrete device assignment or PCI passthrough technology), meaning that an OS or application executing within that operating context has direct control over the peripheral device and can use the peripheral device to perform various tasks—including tasks that rely on DMA capabilities of the peripheral device.

The subject matter claimed herein is not limited to embodiments that solve any disadvantages, or that operate only in environments such as those described supra. Instead, this background is only provided to illustrate one example technology area where some embodiments described herein may be practiced.

SUMMARY

In some aspects, the techniques described herein relate to methods, systems, and computer program products, including: identifying a peripheral device as being removed from a direct assignment to a first operating context of a virtualization environment, wherein the peripheral device is direct memory access (DMA) capable; assigning the peripheral device to a second operating context of the virtualization environment; initiating a device validation against the peripheral device; and based on the device validation indicating that the peripheral device is normal, reassigning the peripheral device to a third operating context of the virtualization environment.

In some aspects, the techniques described herein relate to methods, systems, and computer program products, including: assigning a peripheral device to an operating context within a virtualization environment, wherein the peripheral device is DMA capable; monitoring a signal source that is affected by DMA operations initiated by the peripheral device while the peripheral device is assigned to the operating context; based on monitoring the signal source, identifying a signal pattern characterizing the DMA operations that are initiated by the peripheral device; determining, using the signal pattern, that the DMA operations initiated by the peripheral device are abnormal; and identifying the peripheral device as malicious based on the DMA operations initiated by the peripheral device being abnormal.

This Summary introduces a selection of concepts in a simplified form that are further described below in the Detailed Description. This Summary is not intended to identify key features or essential features of the claimed subject matter, nor is it intended to be used to determine the scope of the claimed subject matter.

BRIEF DESCRIPTION OF THE DRAWINGS

To describe how the advantages of the systems and methods described herein can be obtained, a more particular description of the embodiments briefly described supra is rendered by reference to specific embodiments thereof, which are illustrated in the appended drawings. These drawings depict only typical embodiments of the systems and methods described herein and are not, therefore, to be considered to be limiting in their scope. Systems and methods are described and explained with additional specificity and detail through the use of the accompanying drawings, in which.

DETAILED DESCRIPTION

Figure 1A:
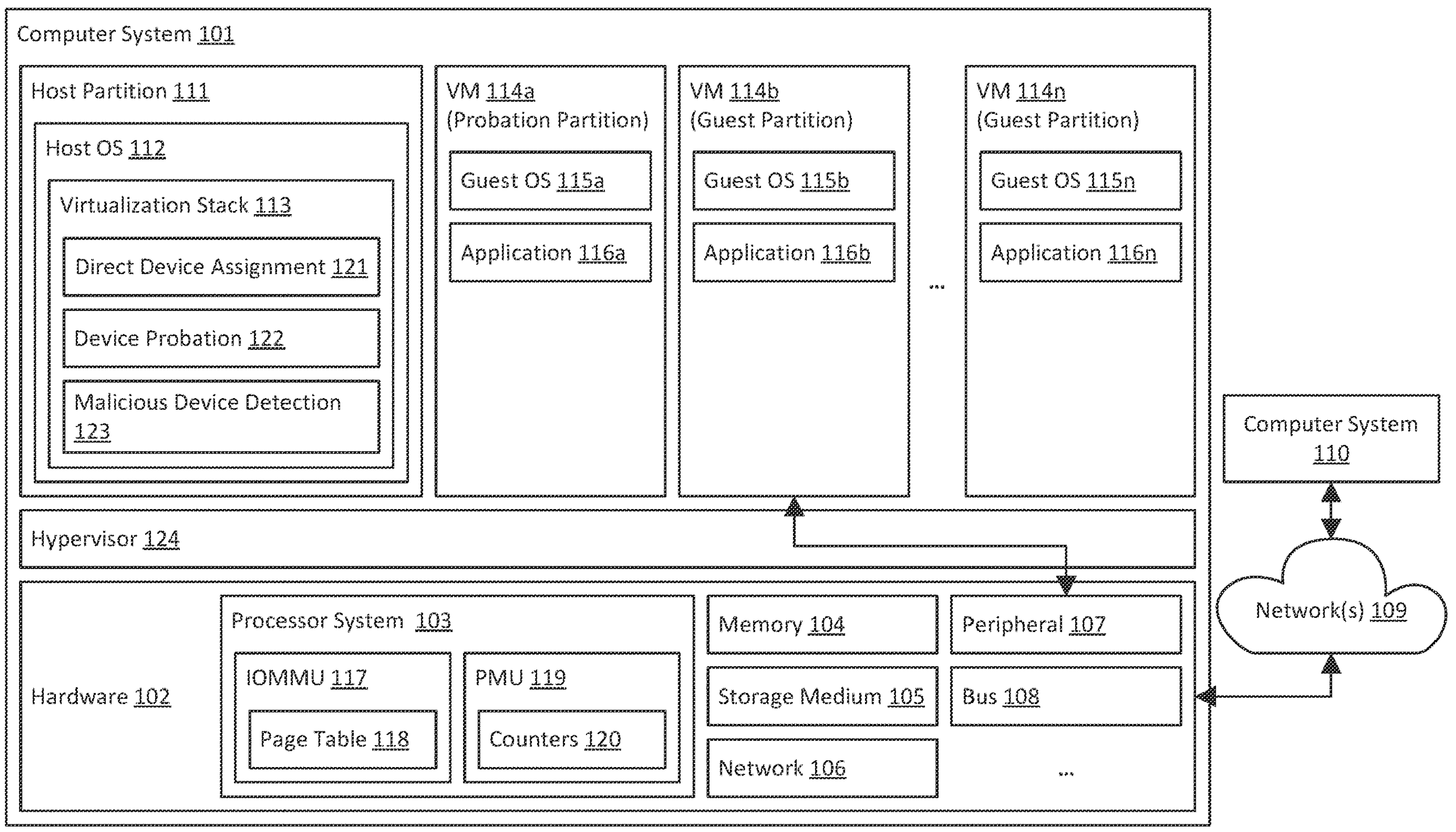
FIG. 1A illustrates an example of a computer architecture that facilitates the probation of direct memory access (DMA) devices used for direct device assignment, and malicious device detection.

When a peripheral device (e.g., one adhering to the peripheral component interconnect express (PCIe) standard, the compute express link (CXL) standard, or some other bus connectivity standard), is removed from a direct assignment to a first operating context within a virtualization environment, it may be reassigned to a second operating context within the virtualization environment. For instance, the peripheral device may be removed from direct assignment to a first guest partition, such as a first guest virtual machine (VM) or a first guest container, to a host partition or another guest partition (e.g., a second guest VM or a second guest container). However, because the first operating context had direct control over the peripheral device, there is a possibility that the device may have been compromised in the first operating context. This could be due to the installation of a malicious or corrupted firmware on the peripheral device or by the application of a malicious or corrupted configuration to the peripheral device. Thus, the assignment of the peripheral device to the second operating context poses a security (and/or stability) risk to the second operating context.

The risk can be particularly high if the peripheral device is direct memory access (DMA) capable because the peripheral device can directly access memory accessible by the second operating context. Thus, for example, a party controlling the first operating context may install malicious firmware on the peripheral device while the device is directly assigned to the first operating context. Then, once the peripheral device is reassigned to the second operating context, the malicious firmware on that peripheral device can be used to access and exfiltrate data from memory accessible by the second operating context—such as a privileged host partition/host operating system (OS), or a guest VM or container operated by another party.

Disclosed methods and systems detect malicious peripheral devices in a virtualization environment before assigning those devices to a potentially sensitive operating context. Initially, a peripheral device that has been removed from a direct assignment to a first operating context within the virtualization environment is identified. This peripheral device is DMA capable, meaning it can access system memory directly, bypassing the central processing unit (CPU) of the physical machine. Once the peripheral device has been identified, it is reassigned to a second operating context within the virtualization environment. The second operating context is a probationary one where the peripheral device can be validated before being assigned to a more sensitive operating context (e.g., a host partition/OS, or a customer VM or container). Thus, a device validation process is initiated after reassignment of the peripheral device to the second operating context. This validation process is designed to assess the state of the peripheral device and determine whether it is operating normally or abnormally (e.g., it may have been compromised in some way). If the device validation process determines that the peripheral device is operating normally, the peripheral device is assigned to a third operating context within the virtualization environment (e.g., a host partition/OS, or a customer VM or container). Otherwise, if the device validation process determines that the peripheral device is operating abnormally, further action may be taken to isolate or remediate the peripheral device.

Identifying the peripheral device as malicious has several implications for managing the virtualization environment. One of the main implications is that it can be used to prevent the reassignment of the device to the third operating context within the virtualization environment. This is because a malicious device could potentially compromise the security of the third operating context and the overall virtualization environment. Therefore, by preventing the reassignment of the malicious device, the system can mitigate the risk of a security breach.

Some embodiments take further action upon identifying a peripheral device as malicious. For instance, these embodiments may initiate a remediation process to clean or reset the device, or they may isolate the device to prevent it from interacting with other system components. In other cases, embodiments may generate an alert or a report detailing the abnormal behavior of the device, which can be used for further investigation or updating an artificial intelligence (AI) model used for device validation.

Disclosed methods and systems also classify a peripheral device as malicious or non-malicious based on observed DMA behaviors by the peripheral device. This classification process involves monitoring a signal source affected by DMA operations initiated by the peripheral device. Based on this monitoring, a signal pattern characterizing the DMA operations initiated by the peripheral device is identified. The signal pattern is then used to determine whether the DMA operations initiated by the peripheral device are normal or abnormal. In embodiments, the peripheral device is subjected to limited tasks during validation. For example, tasks may be limited to general device management operations, firmware updates, etc. By limiting the tasks being performed by the peripheral device during validation, the expected DMA operations by the peripheral device are also limited.

In some embodiments, the signal source is an input/output (I/O) memory management unit (IOMMU), a CPU component that manages and controls the DMA operations of peripheral devices. An IOMMU bridges a peripheral device and system memory, allowing the device to access the system memory directly. This includes managing the mapping of memory addresses (e.g., virtual addresses to physical addresses) during DMA transfers between peripheral devices and system memory. IOMMUs can provide a level of isolation between devices and memory, which can help protect against unauthorized access to memory by compromised devices.

In embodiments, during a peripheral device classification, the IOMMU is monitored to track patterns in DMA operations initiated by the peripheral device. This monitoring process involves observing the IOMMU's activity and recording the various signals it generates as it manages the DMA operations of the peripheral device. These signals provide valuable information about the behavior of the peripheral device and its interaction with the system memory. Based on the monitoring of the IOMMU, a signal pattern characterizing the DMA operations initiated by the peripheral device is identified. This signal pattern provides a detailed profile of the peripheral device's DMA activity, including, for example, the frequency and nature of its memory accesses, the amount of data it transfers, and the memory locations it targets.

The signal pattern serves as a fingerprint of the peripheral device's DMA behavior, providing a basis for assessing whether the device is operating normally or abnormally. This involves comparing the signal pattern to predefined normal patterns or by using an AI model, such as a machine learning (ML) model trained to recognize normal DMA behavior for the peripheral device. If the signal pattern matches one of the normal patterns or is classified as normal by the AI model, the DMA operations are deemed normal. Conversely, if the signal pattern deviates from the normal patterns (e.g., beyond a threshold amount from the normal pattern) or is classified as abnormal by the AI model, the DMA operations are deemed abnormal, indicating that the peripheral device may be compromised.

Some embodiments enable DMA remapping for the peripheral device and create a page table that restricts the memory pages accessible by the peripheral device. A page table maps the peripheral device's DMA addresses to physical memory addresses and serves as a translation layer between the device and the system memory. DMA remapping provides hardware support (e.g., by an IOMMU) for the isolation of a device's access to memory. It also enables each device in the system to be assigned to a specific domain through a distinct set of paging structures. When the device attempts to access system memory, the DMA-remapping hardware intercepts the access and utilizes the page tables to determine whether the access can be permitted. Thus, when DMA remapping is enabled for the peripheral device, the peripheral device can no longer access the system memory directly. Instead, it has to go through its page table, which can be configured to restrict the peripheral device's DMA to a set of specific memory pages and/or to a set of specific permissions. Restricting the memory pages available in the peripheral device's page table enables control of which memory pages the device can access. This restriction can protect sensitive areas of the system memory from being accessed by the peripheral device, thereby enhancing system security. This restriction can also be used to detect, via a page fault, if the peripheral device attempts to access restricted memory. A page fault occurs when the peripheral device attempts to access a memory page that is not present in its page table or that it does not have permission to access. Thus, the signal pattern identified during the device validation process can include one or more page faults. The occurrence of page faults can be a strong indicator of abnormal DMA operations, as an uncompromised device operating within its assigned operating context would typically not attempt to access memory pages outside of its allowed range(s).

In addition to page faults, the signal pattern can include a set of memory pages accessed by the peripheral device, which can also include a frequency of access to particular memory pages (e.g., a heat map of page accesses). For example, the memory pages accessed by the peripheral device, and the frequency of those accessed can be derived from dirty and/or access bits in the peripheral device's page table. This set of memory pages represents the peripheral device's DMA activity during the validation process. By analyzing this set of memory pages, the system can gain insights into the device's memory access patterns and behaviors. For instance, if the peripheral device is accessing a large number of different memory pages in a short period of time, this could indicate that the device is scanning the system memory, which is a common behavior of malicious devices.

A performance monitoring unit (PMU) can provide additional information about the DMA operations initiated by a peripheral device. A PMU can provide detailed performance metrics related to the DMA operations initiated by peripheral device(s). These metrics can be used to gain insights into the peripheral device's DMA activity and behavior, which can be instrumental in identifying abnormal DMA operations. Using a PMU, one type of metric that can be included in a signal pattern is the number of address translations performed by the IOMMU on behalf of the peripheral device (e.g., total translations, or translations as a function of time). The number of address translations can provide an indication of the volume of DMA activity initiated by the peripheral device. For instance, a higher number of address translations than is expected (e.g., based on a prior-determined signal pattern indicating a typical number of address translations for a similar uncompromised peripheral device, based on a trained AI/ML model) could suggest that the peripheral device is accessing a large amount of memory, which could be a sign of abnormal behavior. Another type of metric that can be included in the signal pattern is the amount of data being transferred via DMA by the peripheral device (e.g., total data transferred, or data transferred as a function of time). This metric represents the volume of data that the peripheral device is reading from or writing to the system memory. A sudden increase in the amount of data being transferred could indicate that the peripheral device is performing intensive DMA operations, which could indicate malicious activity. Additionally, the signal pattern can include a metric capturing the hit rate or miss rate in a translation lookaside buffer (TLB) for address translations triggered by the peripheral device. The TLB is a cache the IOMMU uses to speed up the address translation process. A hit in the TLB means that the IOMMU could find the translation for a DMA address in the TLB, while a miss means that the IOMMU had to perform a more time-consuming search in the page table. A high miss rate could suggest that the peripheral device is accessing a wide range of memory locations, which could indicate a memory scanning attack.

Various types of peripheral devices, including PCIe devices, CXL devices, and the like, can be used in the context of the disclosed embodiments. In general, a peripheral device is an internal or external piece of computer hardware equipment that expands the capabilities of the computer. Peripheral devices can be broadly categorized into several types, including hardware accelerators such as graphics processing units (GPUs) and neural processing units (NPUs), hardware controllers such as storage controllers and network controllers, and the like. Each type and sub-type has its own specific characteristics and behaviors, especially regarding DMA operations. These characteristics and behaviors can be used to identify normal and abnormal DMA operations, as will be described in more detail later.

GPUs are specialized electronic circuits designed to rapidly manipulate and alter memory to accelerate the creation of images in a frame buffer intended for output to a display device. GPUs are used, for example, in embedded systems, mobile phones, personal computers, workstations, and game consoles. In the context of the disclosed embodiments, GPUs can be used for tasks such as rendering graphics for display, performing complex calculations, and processing large blocks of data. Storage controllers, also known as storage processors or disk controllers, are devices that manage the physical disk drives in a storage system and serve as the interface between the drives and the rest of the computer system. NPUs are specialized hardware units designed for the efficient execution of ML algorithms. These units are specifically engineered to handle the high computational demands of AI tasks, such as deep learning and neural network processing. NPUs can accelerate AI computations, reduce power consumption, and provide faster data processing compared to traditional CPUs or GPUs. Storage controllers can support various types of storage media, such as hard disk drives, solid-state drives, and optical drives. Network controllers, also known as network interface controllers, network interface cards, network adapters, or local area network (LAN) adapters, are computer hardware components that connect a computer to a computer network. Network controllers can be used for various network-related functions, such as data transmission and reception, network traffic control, and network security.

FIG. 1A illustrates an example 100*a* of a computer architecture that facilitates the probation of DMA devices used for direct device assignment, and malicious device detection of such devices. In example 100*a*, the computer architecture includes a computer system 101 comprising hardware 102. Illustrated examples of hardware 102 include a processor system 103. In one example, processor system 103 is a CPU comprising one or more processor cores or a plurality of CPUs, each including one or more processor cores. In other examples, processor system 103 includes a hardware accelerator, such as a GPU, an NPU, etc. Illustrated examples of hardware 102 also include a memory 104 (e.g., system or main memory), a storage medium 105 (e.g., a single computer-readable storage medium or a plurality of computer-readable storage media), a network interface 106 (e.g., one or more network interface cards), and a peripheral device 107, all interconnected via a bus 108 (e.g., a PCIe bus, a CXL bus). In embodiments, using network interface 106, computer system 101 interconnects with other computer systems (e.g., computer system 110) via network 109. Peripheral device 107 is a DMA-capable device, such as a GPU, an NPU, a storage controller, a network controller, and the like. In some embodiments, network interface 106 and peripheral device 107 are one and the same.

As illustrated in example 100*a*, a hypervisor 124 executes directly on hardware 102. Hypervisor 124 allocates hardware resources (e.g., processor system 103, memory 104, I/O resources) into several operating contexts, such as partitions or containers. In the example of partitions, the partitions include a host partition 111, within which a host OS 112 executes. In embodiments, these partitions also include one or more guest partitions, each corresponding to a VM. FIG. 1A illustrates VMs 114, including VM 114*a*, within which guest OS 115*a* and application 116*a* execute, VM 114*b*, within which guest OS 115*b* and application 116*b* execute, and VM 114*n*, within which guest OS 115*n* and application 116*n* execute. An ellipsis indicates that hypervisor 124 could operate any number of VMs/partitions.

As illustrated, host OS 112 includes a virtualization stack 113, which uses application program interface (API) calls (e.g., hypercalls) to hypervisor 124 to create, manage, and destroy VMs 114. In embodiments, virtualization stack 113 makes decisions about what virtual CPUs to create for each VM, which portion(s) of memory 104 to allocate to each VM, operates para-virtual drivers that multiplex VM access to physical hardware devices (e.g., storage medium 105, network interface 106), and facilities limited communications among partitions via a VM bus (not shown), among other things. In embodiments, one or more functions described herein as being performed by virtualization stack 113 are alternatively performed (at least in part) by hypervisor 124.

Virtualization stack 113 is illustrated as including a direct device assignment component 121. In embodiments, direct device assignment component 121 handles the direct assignment of peripheral device 107 among operating contexts created by hypervisor 124. In FIG. 1A, for example, peripheral device 107 is directly assigned to VM 114*b*, as indicated by an arrow that connects peripheral device 107 and VM 114*b*. Direct device assignment component 121 may handle the assignment of peripheral device 107 to VM 114*b* (or to host partition 111), the removal of peripheral device 107 from VM 114*b* (or host partition 111), and the reassignment of peripheral device 107 to VM 114*n* (or to host partition 111). In making direct device assignments, direct device assignment component 121 utilizes IOMMU 117 to enable peripheral device 107 to utilize DMA to directly access memory accessible to a given operating context to which it is assigned.

As mentioned, an IOMMU is a CPU component that manages and controls the DMA operations of peripheral devices. It bridges a peripheral device (e.g., peripheral device 107) and system memory (e.g., memory 104), allowing the device to access the system memory directly. This includes managing the mapping of memory addresses (e.g., virtual addresses to physical addresses) during DMA transfers between peripheral devices and system memory. Notably, different processor manufacturers refer to IOMMUs by different names. For example, INTEL uses the term IOMMU, while ARM uses the term system memory management unit (SMMU). Regardless of the terminology, in this description and the claims, the term IOMMU refers to any component—such as an SMMU—that performs similar functionality as the IOMMUs described herein.

As mentioned, a party controlling an operating context to which a peripheral device is directly assigned may install malicious firmware on the peripheral device, or otherwise corrupt or maliciously configure the device. Thus, for example, a party controlling VM 114*b* may install malicious firmware on the peripheral device 107, with the intent of accessing memory allocated to another operating context (e.g., host partition 111, VM 114*n*). To prevent or at least mitigate against such risks, virtualization stack 113 is illustrated as including a device probation component 122 that puts a peripheral device being removed from direct assignment to an operating context (e.g., VM 114*b*) through a probation process in a separate operating context (e.g., VM 114*a*, labeled in FIG. 1A as a probationary partition) before assigning that device to a more sensitive operating context (e.g., host partition 111, VM 114*n*). In embodiments, this operating context lacks access to sensitive memory or data at computer system 101. Additionally, or alternatively, virtualization stack 113 is illustrated as including a malicious device detection component 123 that uses signals from IOMMU 117 to determine if a peripheral device is operating normally or abnormally.

The following discussion now refers to several methods and method acts. Although the method acts are discussed in specific orders or are illustrated in a flow chart as occurring in a particular order, no order is required unless expressly stated or required because an act is dependent on another act being completed before the act is performed.

Figure 1B:
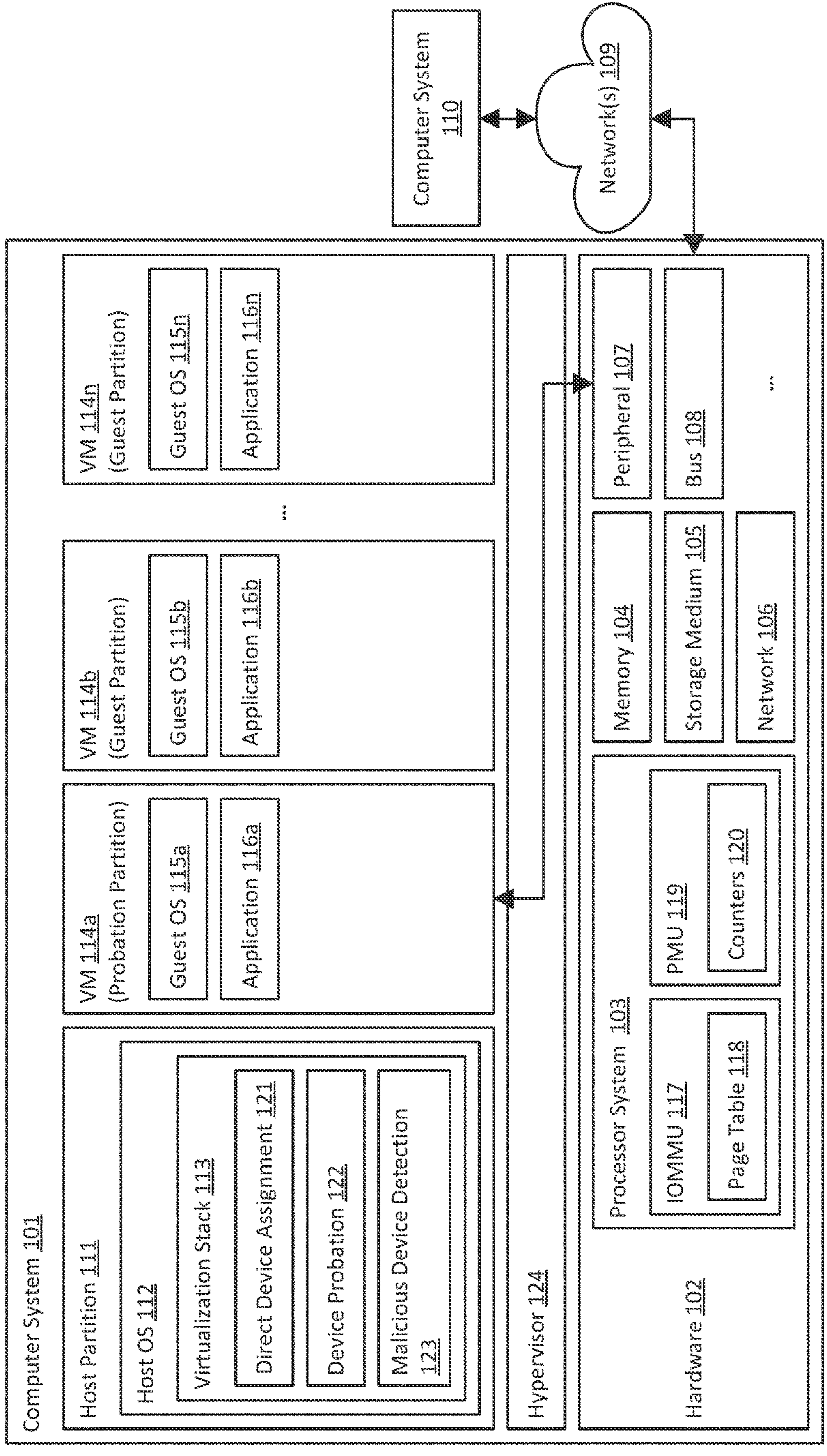
FIG. 1B illustrates an example of the assignment of the peripheral device from a guest operating context to a probationary operating context.
Figure 1C:
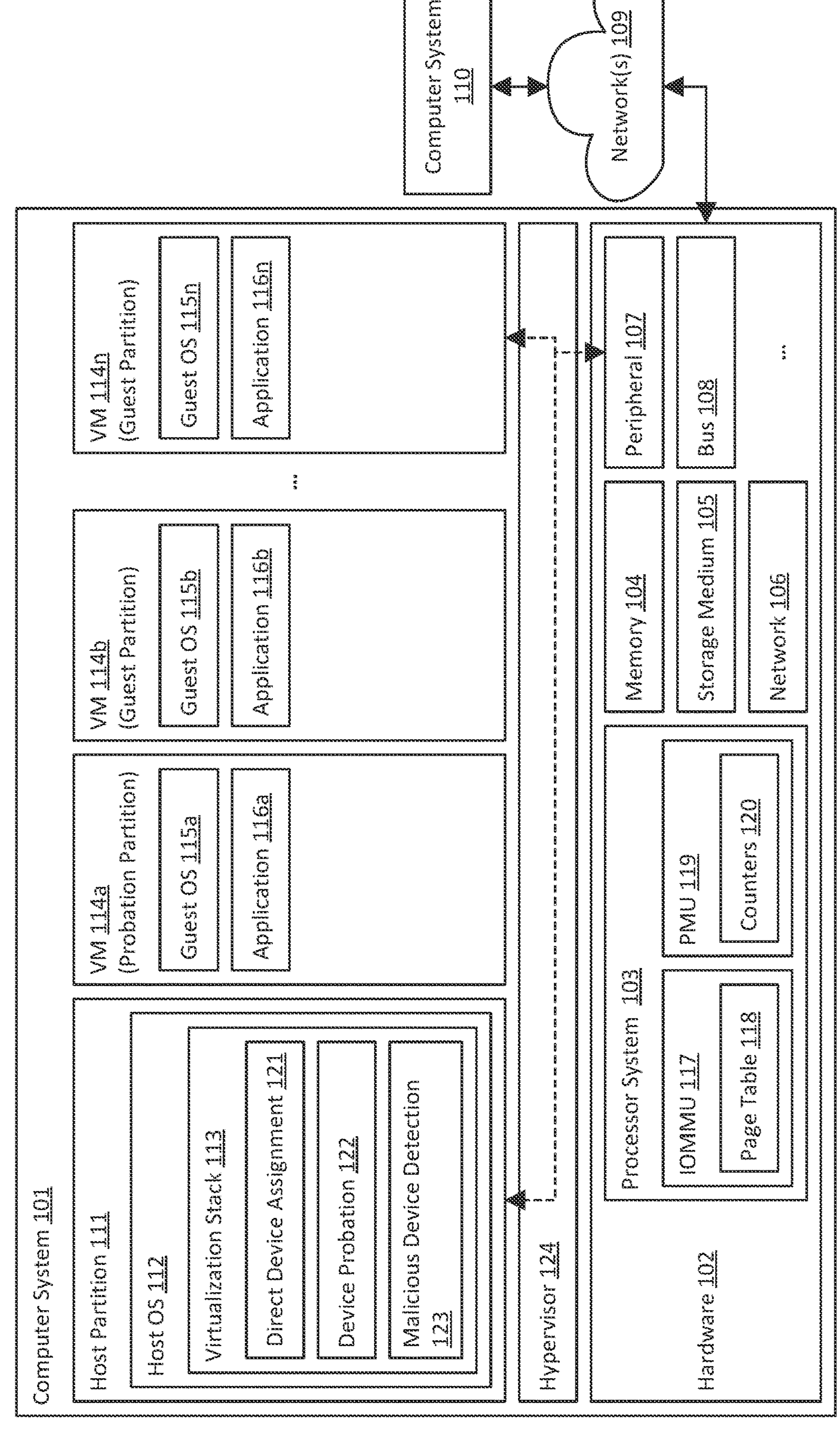
FIG. 1C illustrates an example of the assignment of the peripheral device from the probationary operating context to another guest operating context or a host partition.

Operation of the device probation component 122 is now described in connection with FIGS. 1A-1C. Operation of the device probation component 122 is also described in connection with FIG. 2, which illustrates a flow chart of an example method 200 for the probation of a DMA device used for direct device assignment.

In embodiments, instructions for implementing method 200 are encoded as computer-executable instructions (e.g., representing device probation component 122) stored on a computer storage media (e.g., storage medium 105) that are executable by a processor (e.g., processor system 103) to cause a computer system (e.g., computer system 101) to perform method 200.

In embodiments, device probation component 122 operates based on the removal of a peripheral device (e.g., by direct device assignment component 121) from an operating context that had direct access to that peripheral device. Thus, referring to FIG. 2, in embodiments, method 200 comprises act 201 of identifying a peripheral device being removed from an operating context. In some embodiments, act 201 comprises identifying a peripheral device as being removed from a direct assignment to a first operating context of a virtualization environment, wherein the peripheral device is direct DMA capable. For example, referring to FIG. 1A, device probation component 122 detects when direct device assignment component 121 has removed peripheral device 107 from being directly assigned to VM 114*b*. In embodiments, the peripheral device adheres to a bus connectivity standard, such as PCIe, CXL, and the like. In embodiments, the peripheral device is a hardware accelerator (e.g., GPU, NPU) or a hardware controller (e.g., storage controller, network controller).

In embodiments, based on the removal of the peripheral device from its prior operating context, the device probation component 122 assigns the peripheral device to another operating context in which the DMA activity of the device can be monitored and controlled.

In some embodiments, this other operating context is a host partition (e.g., host partition 111), or some limited portion thereof, where a host OS (e.g., host OS 112) can enforce strict controls over the peripheral device. For example, in the context of WINDOWS and HYPER-V, this other operating context may be a portion (e.g., a different virtual trust level) of the host partition that is isolated from the rest of the host partition using virtualization-based security (VBS).

In other embodiments, this other operating context is a guest partition configured to be, or at least designated as, a probationary partition. For example, VM 114*a* is designated in FIG. 1A as a probationary partition. In embodiments, a probationary partition lacks access to sensitive memory or data (e.g., because it does not operate sensitive workloads, because hypervisor 124 prevents it from accessing sensitive areas of memory 104), mitigating the risk of directly assigning a malicious peripheral device to that partition.

Figure 2:
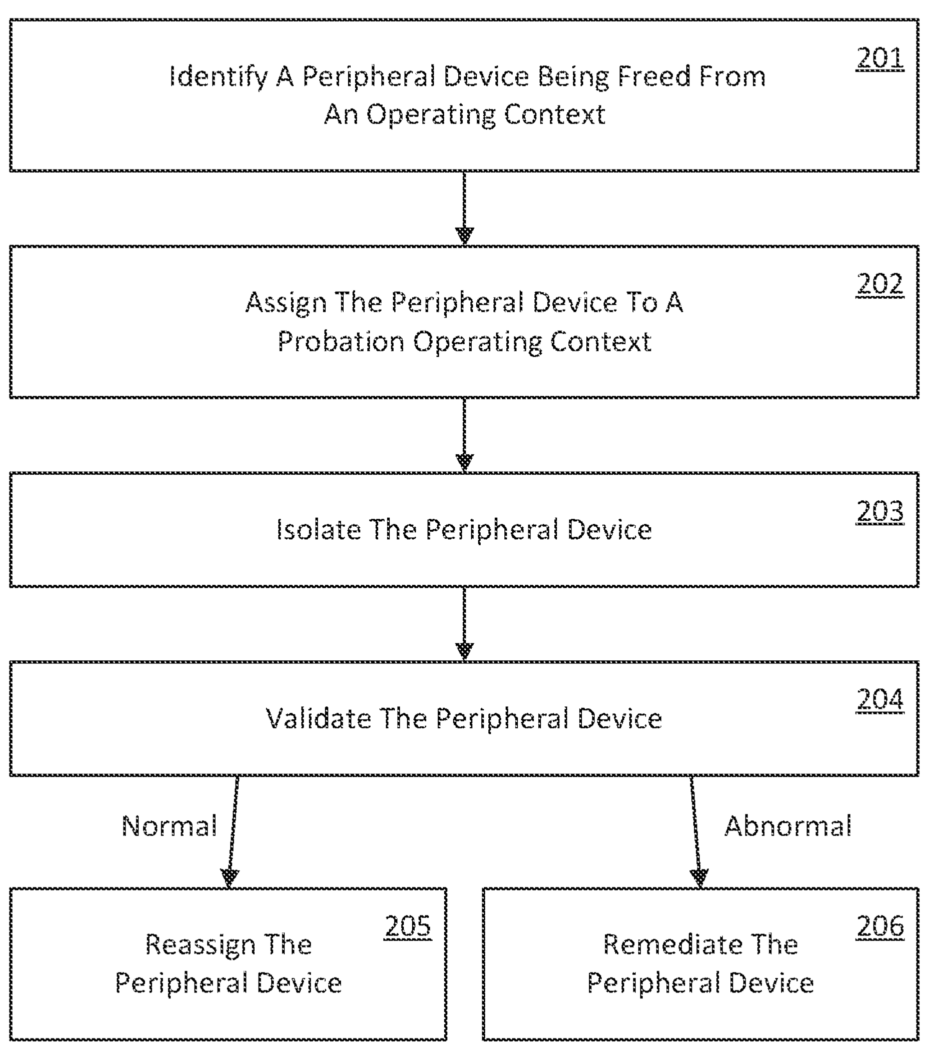
FIG. 2 illustrates a flow chart of an example of a method for the probation of a DMA device used for direct device assignment.

Referring to FIG. 2, method 200 also comprises act 202 of assigning the peripheral device to a probation operating context. In some embodiments, act 202 comprises assigning the peripheral device to a second operating context of the virtualization environment. For instance, FIG. 1B illustrates an example 100*b* of the assignment of the peripheral device from a guest operating context to a probationary operating context. In FIG. 1B, an arrow that connects peripheral device 107 to VM 114*a* indicates that the device probation component 122 has directly assigned peripheral device 107 to VM 114*a* (e.g., based on an instruction to direct device assignment component 121).

In some embodiments, once device probation component 122 has assigned a peripheral device to a probationary operating context, the device probation component 122 carries out some action to further isolate the peripheral device within that operating context. For example, device probation component 122 may disable DMA for the peripheral device, and/or may enable DMA remapping for the peripheral device. In embodiments, disabling DMA for the peripheral device comprises disabling DMA for the operating context. In embodiments, enabling DMA remapping for the peripheral device comprises enabling DMA remapping for the operating context, or enabling DMA remapping for the peripheral device's driver. In some embodiments, and the context of WINDOWS and HYPER-V, device probation component 122 may utilize a component within virtual trust level (VTL) zero at a host partition to set IOMMU rules that limit DMA for a peripheral device.

Referring to FIG. 2, in some embodiments, method 200 also comprises act 203 of isolating the peripheral device. In some embodiments, act 203 comprises applying an isolation action to the peripheral device. In embodiments, the isolation action includes one or more of initiating an FLR on the peripheral device, disabling DMA for the peripheral device, or enabling DMA remapping for the peripheral device.

After device probation component 122 has assigned a peripheral device to a probationary operating context, device probation component 122 validates the peripheral device, classifying it as normal (malicious) or abnormal (non-malicious).

In embodiments, the device probation component 122 relies on a cryptographic validation of the peripheral device's firmware. For example, utilizing the trusted execution environment (TEE) device interface security protocol (TDISP), device probation component 122 cryptographically verifies that the peripheral device has expected firmware and is thus normal.

Additionally, or alternatively, in embodiments, the device probation component 122 relies on a software tool that runs one or more tests against the peripheral device to validate its normal operation. For example, the device probation component 122 may execute a vendor-provided validation program against the peripheral device.

Additionally, or alternatively, in embodiments, the device probation component 122 relies on the malicious device detection component 123 to validate the peripheral device based on observed DMA behaviors caused by the peripheral device. These techniques are described in greater detail in connection with method 300.

Referring to FIG. 2, method 200 also comprises act 204 of validating the peripheral device. In some embodiments, act 204 comprises initiating a device validation against the peripheral device. For example, while peripheral device 107 is assigned to VM 114*a*, device probation component 122 carries out one or more validation operations on peripheral device 107. The nature of these validation operations can vary, but examples include cryptographically validating the peripheral device 107 using TDISP, initiating a validation program (e.g., vendor-supplied) against the peripheral device 107, or relying on malicious device detection component 123 to validate the peripheral device 107.

In some embodiments (e.g., when a result of act 204 is a determination that peripheral device 107 is operating normally), method 200 also comprises act 205 of reassigning the peripheral device. In some embodiments, act 205 comprises based on the device validation indicating that the peripheral device is normal, reassigning the peripheral device to a third operating context of the virtualization environment. For instance, FIG. 1C illustrates example 100*c* of the assignment of the peripheral device from the probationary operating context to another guest operating context or a host partition. In FIG. 1C, an arrow that connects peripheral device 107 to host partition 111 or VM 114*n* indicates that the device probation component 122 has directly assigned peripheral device 107 to either host partition 111 or VM 114*n* (e.g., based on an instruction to direct device assignment component 121).

In other embodiments (e.g., when a result of act 204 is a determination that peripheral device 107 is operating abnormally), method 200 also comprises act 206 of remediating the peripheral device. The nature of remediation can vary widely, such as discontinuing the use of the peripheral device (e.g., placing it on a block list, powering down the peripheral device), blocking or isolating the peripheral device (e.g., disabling DMA for the peripheral device, disabling interrupts for the peripheral device), initiating a cleaning operation on the peripheral device, etc. In embodiments, cleaning operation comprises replacing the firmware on the peripheral device, initiating a function level reset (FLR) on the peripheral device (e.g., resetting the device), initiating a sanitization program (e.g., vendor-supplied) on the peripheral device, and the like.

Notably, depending on the nature of the virtualization environment, the nature of each operating context can vary. For example, in a hypervisor-based environment, as shown in FIGS. 1A-1C, the first operating context may be a first guest VM, the second operating context may be a probationary VM, and the third operating context may be a root partition or a second guest VM. In a container orchestration-based environment (e.g., KUBERNETES), the first operating context may be a first guest container (e.g., a DOCKER container), the second operating context may be a probationary container (e.g., a DOCKER container), and the third operating context may be a host OS or a second guest container (e.g., a DOCKER container).

Operation of the malicious device detection component 123 is now described in connection with FIG. 3, which illustrates a flow chart of an example method 300 for detecting a malicious DMA device used for direct device assignment.

In embodiments, instructions for implementing method 300 are encoded as computer-executable instructions (e.g., representing malicious device detection component 123) stored on a computer storage media (e.g., storage medium 105) that are executable by a processor (e.g., processor system 103) to cause a computer system (e.g., computer system 101) to perform method 300.

In some embodiments, malicious device detection component 123 operates after the direct assignment of a peripheral device (e.g., by direct device assignment component 121) to an operating context. Thus, referring to FIG. 3, in some embodiments, method 300 comprises act 301 of assigning a peripheral device to an operating context. In some embodiments, act 301 comprises assigning a peripheral device to an operating context within a virtualization environment, wherein the peripheral device is DMA capable. For example, in FIG. 1B, peripheral device 107 is directly assigned to VM 114*b*. In embodiments, the peripheral device adheres to a bus connectivity standard, such as PCIe, CXL, and the like. In embodiments, the peripheral device is a hardware accelerator (e.g., GPU, NPU) or a hardware controller (e.g., storage controller, network controller).

In some embodiments, malicious device detection component 123 determines if a peripheral device operates normally or abnormally based on monitoring signals relating to the device's operation. In some embodiments, these signals relate to DMA activity by the peripheral device. Referring to FIG. 3, method 300 comprises act 302 of monitoring DMA signals caused by the peripheral device. In some embodiments, act 302 comprises monitoring a signal source affected by DMA operations initiated by the peripheral device while the peripheral device is assigned to the operating context.

In embodiments, the signal source is an IOMMU. For example, when peripheral device 107 carries out DMA operations within the context of VM 114*b*, those DMA operations are facilitated by IOMMU 117. Thus, signal data derived from IOMMU 117 reflects DMA operations by peripheral device 107. Additionally, or alternatively, in embodiments, the signal source is a PMU. For example, when peripheral device 107 carries out DMA operations within the context of VM 114*b*, those DMA operations affect counters 120 maintained by PMU 119. Thus, signal data derived from PMU 119 also reflects DMA operations by peripheral device 107.

In embodiments, based on monitoring a signal source (e.g., an IOMMU, a PMU), malicious device detection component 123 identifies one or more signal patterns characterizing DMA operations performed by a peripheral device. Referring to FIG. 3, method 300 also comprises act 303 of identifying a DMA signal pattern. In some embodiments, act 303 comprises, based on monitoring the signal source, identifying a signal pattern characterizing the DMA operations initiated by the peripheral device.

As mentioned, in embodiments, the signal source is an IOMMU (e.g., IOMMU 117). In some embodiments, when the signal source is IOMMU 117, the signal pattern includes one or more page faults caused by DMA operations by peripheral device 107. For example, in embodiments, malicious device detection component 123 enables DMA remapping for an operating context (e.g., VM 114*a*) to which peripheral device 107 is assigned and creates a page table (e.g., page table 118) restricting memory pages accessible by peripheral device 107. This means that a page fault will occur if peripheral device 107 attempts to access any memory pages that are not in page table 118, or to which peripheral device 107 lacks permission (e.g., attempting to write to a page to which it only has read access). In some embodiments, when creating a page table for a peripheral device, malicious device detection component 123 excludes non-pageable OS memory pages, or at least limits the peripheral device to having read (and not write) access to non-pageable OS memory pages. The occurrence of page faults can be a strong indicator of abnormal DMA operations, as a normal device operating within its assigned operating context would typically not attempt to access memory pages outside of its allowed range(s).

In additional or alternative embodiments, when the signal source is an IOMMU, the signal pattern includes a set of memory pages accessed by the peripheral device, which may include a frequency of accesses to different memory pages in the set of memory pages. For example, the memory pages accessed by peripheral device 107, and the frequency of those accessed can be derived from dirty and access bits within page table 118. This set of memory pages can provide insights into the memory access patterns and behaviors of the peripheral device 107. For instance, if peripheral device 107 is accessing a large number of different memory pages in a short period of time, this could indicate that peripheral device 107 is scanning memory 104, which is a common behavior of malicious devices.

As mentioned, in some embodiments, the signal source is a PMU (e.g., PMU 119). In some embodiments, when the signal source is PMU 119, the signal pattern includes metrics derived from counters 120. One example metric is the number of address translations performed by IOMMU 117 on behalf of peripheral device 107. The number of address translations can indicate the volume of DMA activity initiated by peripheral device 107. For instance, a higher number of address translations than is expected could suggest that peripheral device 107 is accessing a large amount of memory 104, which could be a sign of abnormal behavior. Another example metric is the amount of data transferred via DMA by peripheral device 107. A sudden increase in the amount of data being transferred could indicate that peripheral device 107 is performing intensive DMA operations, which could indicate malicious activity. Other metrics may include a ratio of successful address translations per unit of data transferred via DMA by peripheral device 107, and a hit rate or a miss rate in a translation lookaside buffer for address translations triggered by peripheral device 107. A high miss rate could suggest that the peripheral device is accessing a wide range of memory locations within memory 104, indicating a memory scanning attack.

In embodiments, malicious device detection component 123 uses DMA signal pattern(s) to determine if the DMA activity of a peripheral device is normal or abnormal. The signal pattern(s) serve as a fingerprint of the DMA behavior of the peripheral device, providing a basis for assessing whether the device is operating normally or abnormally. In some embodiments, malicious device detection component 123 compares a signal pattern to a set of predefined normal patterns, or to an AI model trained to recognize normal DMA behavior (e.g., for a given device type, for a given device manufacturer, for a given device model, for a given firmware build, for a given workload). As used herein, reference to AI or ML may include any type of ML algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), AI device(s), or any other type of intelligent computing system. Any amount of training data may be used (and perhaps later refined) to train the ML algorithm. In embodiments, an AI/ML model is trained based on DMA behaviors of a peripheral device that is known to be uncompromised. For example, training inputs could include any of the signal patterns characterizing the DMA operations discussed earlier (e.g., based on single sources such as an IOMMU, a PMU, etc.). In embodiments, a single AI/ML model could be trained for a variety of devices, or there could be different AI/ML models for more specific device classifications (e.g., device type, device manufacturer, device model).

Figure 3:
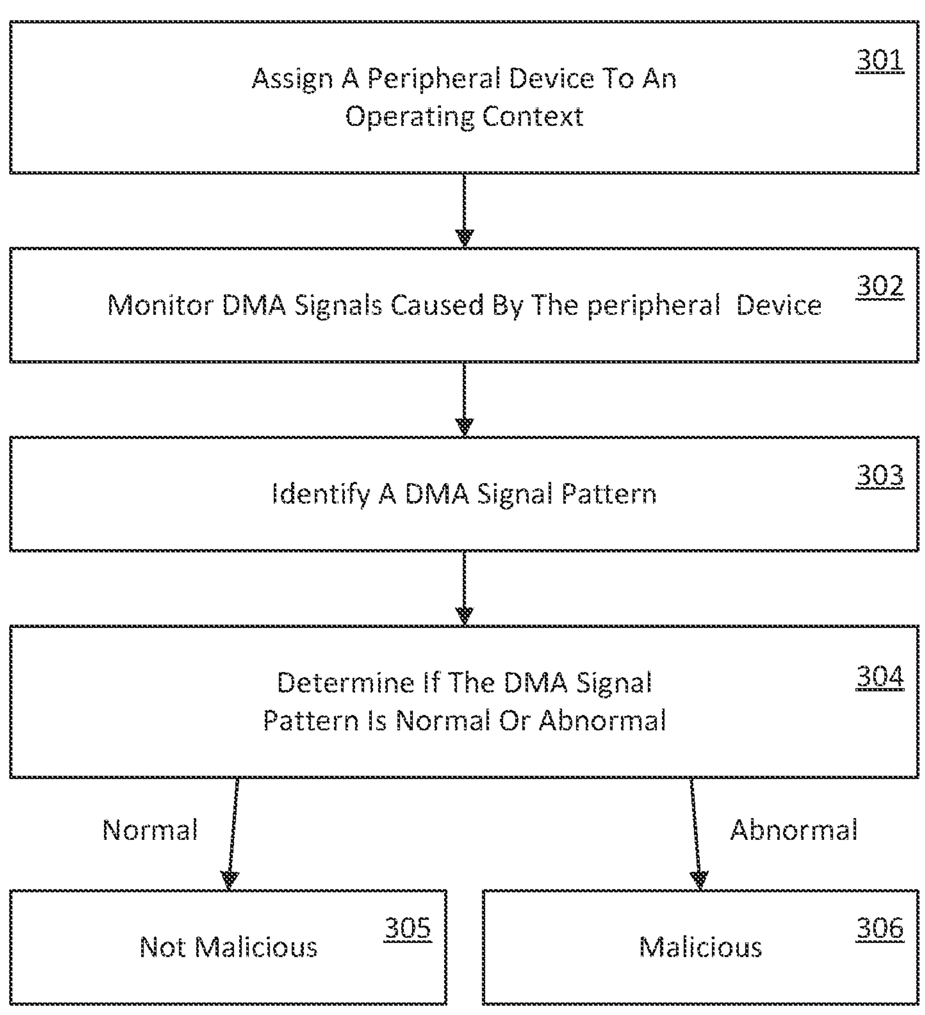
FIG. 3 illustrates a flow chart of an example of a method for detecting a malicious DMA device used for direct device assignment.

Referring to FIG. 3, method 300 also comprises act 304 of determining if the DMA signal pattern is normal or abnormal. In some embodiments, act 304 comprises determining, using the signal pattern, if the DMA operations initiated by the peripheral device are normal or abnormal. For example, malicious device detection component 123 determines if signal patterns observed from IOMMU 117 and/or PMU 119 are normal for peripheral device 107, e.g., based on baselines derived from similar peripheral devices, similar workloads, etc.

In some embodiments, determining if the DMA operations initiated by a peripheral device are normal or abnormal comprises inputting a signal pattern to an AI model. In embodiments, the AI model is an ML model trained on signal patterns identified from other peripheral devices, such as other devices that have the same device type (e.g., GPU, storage controller, or network controller), other devices that have the same device manufacturer, other devices that have the same (or a similar) device model, other devices that have the same (or a similar) firmware build, other devices or that carry out similar workloads.

In some embodiments (e.g., when a result of act 304 is a determination that peripheral device 107 is operating normally), method 300 also comprises act 305 of determining that the peripheral device is not malicious. In some embodiments, act 305 comprises identifying the peripheral device as not malicious based on the DMA operations initiated by the peripheral device being normal.

In other embodiments (e.g., when a result of act 304 is a determination that peripheral device 107 is operating abnormally), method 300 also comprises act 306 of determining that the peripheral device is malicious. In some embodiments, act 306 comprises identifying the peripheral device as malicious based on the DMA operations initiated by the peripheral device being abnormal.

Returning to method 200, it was mentioned in connection with act 204 that the act may rely on malicious device detection component 123 to validate peripheral device 107. Thus, in some embodiments, act 204 of method 200 comprises at least a portion of method 300 (e.g., act 302 to act 304). Thus, in some embodiments of act 204, initiating the device validation against the peripheral device comprises: monitoring a signal source that is affected by DMA operations initiated by the peripheral device while the peripheral device is assigned to the second operating context (e.g., act 302); based on monitoring the signal source, identifying a signal pattern characterizing the DMA operations that are initiated by the peripheral device (e.g., act 303); and determining, using the signal pattern, that the DMA operations initiated by the peripheral device are normal or abnormal (e.g., act 304).

In some embodiments of act 204, the signal source is an IOMMU (e.g., IOMMU 117). In these embodiments, method 200 may comprise enabling DMA remapping for the peripheral device and creating a page table restricting memory pages that are accessible by the peripheral device. In these embodiments, the signal pattern (e.g., act 303) may include one or more page faults, a set of memory pages accessed by the peripheral device, a frequency of accesses to different memory pages in the set of memory pages, and the like.

In some embodiments of act 204, the signal source includes a PMU (e.g., PMU 119). In these embodiments, the signal pattern (act 303) may include the number of address translations performed by the IOMMU on behalf of the peripheral device, the amount of data being transferred via DMA by the peripheral device, a ratio of successful address translations per a unit of data transferred via DMA by the peripheral device, a hit rate or a miss rate in a translation lookaside buffer for address translations triggered by the peripheral device, and the like.

Embodiments of the disclosure comprise or utilize a special-purpose or general-purpose computer system (e.g., computer system 101) that includes computer hardware, such as, for example, a processor system (e.g., processor system 103) and system memory (e.g., memory 104), as discussed in greater detail below. Embodiments within the scope of the present disclosure also include physical and other computer-readable media for carrying or storing computer-executable instructions and/or data structures. Such computer-readable media can be any available media accessible by a general-purpose or special-purpose computer system. Computer-readable media that store computer-executable instructions and/or data structures are computer storage media (e.g., storage medium 105). Computer-readable media that carry computer-executable instructions and/or data structures are transmission media. Thus, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which store program code in the form of computer-executable instructions or data structures, which can be accessed and executed by a general-purpose or special-purpose computer system to implement the disclosed functionality.

Transmission media include a network and/or data links that carry program code in the form of computer-executable instructions or data structures that are accessible by a general-purpose or special-purpose computer system. A "network" is defined as a data link that enables the transport of electronic data between computer systems and other electronic devices. When information is transferred or provided over a network or another communications connection (either hardwired, wireless, or a combination thereof) to a computer system, the computer system may view the connection as transmission media. The scope of computer-readable media includes combinations thereof.

Upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 106) and eventually transferred to computer system RAM and/or less volatile computer storage media at a computer system. Thus, computer storage media can be included in computer system components that also utilize transmission media.

Computer-executable instructions comprise, for example, instructions and data which when executed at a processor system, cause a general-purpose computer system, a special-purpose computer system, or a special-purpose processing device to perform a function or group of functions. In embodiments, computer-executable instructions comprise binaries, intermediate format instructions (e.g., assembly language), or source code. In embodiments, a processor system comprises one or more CPUs, one or more GPUs, one or more NPUs, and the like.

In some embodiments, the disclosed systems and methods are practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAS, tablets, pagers, routers, switches, and the like. In some embodiments, the disclosed systems and methods are practiced in distributed system environments where different computer systems, which are linked through a network (e.g., by hardwired data links, wireless data links, or by a combination of hardwired and wireless data links), both perform tasks. As such, in a distributed system environment, a computer system may include a plurality of constituent computer systems. Program modules may be located in local and remote memory storage devices in a distributed system environment.

In some embodiments, the disclosed systems and methods are practiced in a cloud computing environment. In some embodiments, cloud computing environments are distributed, although this is not required. When distributed, cloud computing environments may be distributed internally within an organization and/or have components possessed across multiple organizations. In this description and the following claims, "cloud computing" is a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as Software as a Service (Saas), Platform as a Service (PaaS), Infrastructure as a Service (IaaS), etc. The cloud computing model may also be deployed using different deployment models such as private cloud, community cloud, public cloud, hybrid cloud, etc.

Some embodiments, such as a cloud computing environment, comprise a system with one or more hosts capable of running one or more VMs. During operation, VMs emulate an operational computing system, supporting an OS and perhaps one or more other applications. In some embodiments, each host includes a hypervisor that emulates virtual resources for the VMs using physical resources that are abstracted from the view of the VMs. The hypervisor also provides proper isolation between the VMs. Thus, from the perspective of any given VM, the hypervisor provides the illusion that the VM is interfacing with a physical resource, even though the VM only interfaces with the appearance (e.g., a virtual resource) of a physical resource. Examples of physical resources include processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described supra or the order of the acts described supra. Rather, the described features and acts are disclosed as example forms of implementing the claims.

The present disclosure may be embodied in other specific forms without departing from its essential characteristics. The described embodiments are only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method implemented in a computer system that includes a processor system, comprising:

re-assigning a peripheral device from a first guest partition within a virtualization environment to a host-controlled operating context within the virtualization environment, wherein the peripheral device is direct memory access (DMA) capable;

monitoring a signal source that is affected by DMA operations initiated by the peripheral device while the peripheral device is assigned to the host-controlled operating context, wherein the signal source is an input/output memory management unit (IOMMU);

based on monitoring the signal source, identifying a signal pattern characterizing the DMA operations that are initiated by the peripheral device, the signal pattern characterizing at least one of a frequency of memory accesses by the peripheral device, an amount of data being transferred by the peripheral device, or a set of memory locations targeted by the peripheral device;

determining, using the signal pattern, that the DMA operations initiated by the peripheral device are abnormal;

identifying the peripheral device as malicious based on the DMA operations initiated by the peripheral device being abnormal; and based on identifying the peripheral device as malicious, preventing assignment of the peripheral device to a second guest partition within the virtualization environment.

2. The method of claim 1, wherein the peripheral device adheres to a bus connectivity standard.

3. The method of claim 1, wherein the peripheral device is one of a hardware accelerator or a hardware controller.

4. The method of claim 1, wherein, the method further comprises:

enabling DMA remapping; and creating a page table restricting memory pages that are accessible by the peripheral device; and the signal pattern includes a page fault.

5. The method of claim 1, wherein the signal pattern includes the set of memory locations targeted by the peripheral device.

6. The method of claim 5, wherein the signal pattern includes a frequency of accesses to different memory pages in the set of memory locations.

7. The method of claim 1, wherein the signal source includes a performance monitoring unit (PMU).

8. The method of claim 7, wherein the signal pattern includes at least one of, a number of address translations performed by the IOMMU on behalf of the peripheral device, amount of data being transferred via DMA by the peripheral device, a ratio of successful address translations per a unit of data transferred via DMA by the peripheral device; or a hit rate or a miss rate in a translation lookaside buffer for address translations triggered by the peripheral device.

9. The method of claim 1, wherein, the first guest partition is a guest virtual machine (VM) or a guest container; and the host-controlled operating context is a root partition, host operating system, or a probationary VM.

10. The method of claim 1, wherein identifying the peripheral device as malicious comprises inputting the signal pattern to an artificial intelligence model.

11. The method of claim 10, wherein the artificial intelligence model is a machine learning model trained on signal patterns identified from an other peripheral device.

12. The method of claim 11, wherein the other peripheral device and the peripheral device share at least one of, a device type, a device manufacturer, a device model, a firmware build, or a workload.

13. A virtualization computer system, comprising:

a processor system comprising an input/output memory management unit (IOMMU); and a computer storage medium that stores computer-executable instructions that are executable by the processor system to at least:

re-assign a peripheral device from a first guest partition at the virtualization computer system to a host-controlled operating context at the virtualization computer system, wherein the peripheral device is direct memory access (DMA) capable;

monitor an IOMMU signal source while the peripheral device is assigned to the host-controlled operating context;

based on monitoring the IOMMU signal source, identify a signal pattern characterizing DMA operations that are initiated by the peripheral device, the signal pattern characterizing at least one of a frequency of memory accesses by the peripheral device, an amount of data being transferred by the peripheral device, or a set of memory locations targeted by the peripheral device;

determine, using the signal pattern, that the DMA operations initiated by the peripheral device are abnormal;

identify the peripheral device as malicious based on the DMA operations initiated by the peripheral device being abnormal; and based on identifying the peripheral device as malicious, preventing assignment of the peripheral device to a second guest partition at the virtualization computer system.

14. The virtualization computer system of claim 13, wherein, the computer-executable instructions are also executable by the processor system to, enable DMA remapping; and create a page table restricting memory pages that are accessible by the peripheral device;

and the signal pattern includes page fault.

15. The virtualization computer system of claim 13, wherein the signal pattern includes a set of memory pages accessed by the peripheral device, including a frequency of accesses to different memory pages in the set of memory pages.

16. The virtualization computer system of claim 13, wherein the IOMMU signal source includes a performance monitoring unit (PMU) metric, and wherein the signal pattern includes at least one of, a number of address translations performed by the IOMMU on behalf of the peripheral device, amount of data being transferred via DMA by the peripheral device, a ratio of successful address translations per a unit of data transferred via DMA by the peripheral device; or a hit rate or a miss rate in a translation lookaside buffer for address translations triggered by the peripheral device.

17. A computer storage medium that stores computer-executable instructions that are executable by a processor system that includes an input/output memory management unit (IOMMU) to at least:

reassign a peripheral device from a first operating context within a virtualization environment to a second operating context within the virtualization environment, wherein, the peripheral device is direct memory access (DMA) capable;

the first operating context comprises a guest virtual machine (VM); and the second operating context comprises a root partition or a probationary VM;

monitor an IOMMU signal source while the peripheral device is assigned to the second operating context;

based on monitoring the IOMMU signal source, identify a signal pattern characterizing DMA operations that are initiated by the peripheral device, the signal pattern characterizing at least one of a frequency of memory accesses by the peripheral device, an amount of data being transferred by the peripheral device, or a set of memory locations targeted by the peripheral device;

determine, using the signal pattern and an artificial intelligence or machine learning model, that the DMA operations initiated by the peripheral device are abnormal;

identify the peripheral device as malicious based on the DMA operations initiated by the peripheral device being abnormal; and based on identifying the peripheral device as malicious, prevent assignment of the peripheral device to a third operating context within the virtualization environment.

18. The computer storage medium of claim 17, wherein, the IOMMU signal source includes a performance monitoring unit (PMU) metric, and the signal pattern includes at least one of, a number of address translations performed by the IOMMU on behalf of the peripheral device, amount of data being transferred via DMA by the peripheral device, a ratio of successful address translations per a unit of data transferred via DMA by the peripheral device; or a hit rate or a miss rate in a translation lookaside buffer for address translations triggered by the peripheral device.

* * * * *